(12) United States Patent
Tscharnuter et al.

(10) Patent No.: US 10,836,031 B2
(45) Date of Patent: Nov. 17, 2020

(54) PLUG-IN ADAPTER, ADJUSTMENT INSTRUMENT, AND ASSOCIATED ROBOT

(71) Applicant: KUKA Deutschland GmbH, Augsburg (DE)

(72) Inventors: Dietmar Tscharnuter, Friedberg (DE); Gernot Nitz, Gersthofen (DE); Gerhard Brändle, Wertingen (DE)

(73) Assignee: KUKA Deutschland GmbH, Augsburg (DE)

( * ) Notice: Subject to any disclaimer, the term of this patent is extended or adjusted under 35 U.S.C. 154(b) by 82 days.

(21) Appl. No.: 16/321,383

(22) PCT Filed: Jul. 19, 2017

(86) PCT No.: PCT/EP2017/068188
§ 371 (c)(1),
(2) Date: Jan. 28, 2019

(87) PCT Pub. No.: WO2018/019673
PCT Pub. Date: Feb. 1, 2018

(65) Prior Publication Data
US 2019/0168381 A1    Jun. 6, 2019

(30) Foreign Application Priority Data
Jul. 28, 2016  (DE) .................. 10 2016 213 965

(51) Int. Cl.
*B25J 9/10* (2006.01)
*G01D 11/24* (2006.01)
(Continued)

(52) U.S. Cl.
CPC .......... *B25J 9/1015* (2013.01); *B25J 9/0009* (2013.01); *B25J 9/1692* (2013.01); *B25J 19/007* (2013.01);
(Continued)

(58) Field of Classification Search
CPC ...... B25J 9/1015; B25J 9/0009; B25J 9/1692; B25J 9/0066; B25J 19/007
See application file for complete search history.

(56) References Cited

U.S. PATENT DOCUMENTS

| 4,419,831 A | 12/1983 | Zimmer |
| 2007/0120512 A1* | 5/2007 | Albu-Schaffer ....... B25J 9/1643 318/568.2 |

(Continued)

FOREIGN PATENT DOCUMENTS

| CN | 102975208 A | 3/2013 |
| DE | 3832457 A1 | 11/1989 |

(Continued)

OTHER PUBLICATIONS

European Patent Office; Search Report in related International Patent Application No. PCT/EP2017/068188 dated Nov. 23, 2017; 3 pages.

*Primary Examiner* — David M Fenstermacher
(74) *Attorney, Agent, or Firm* — Dorton & Willis, LLP

(57) ABSTRACT

A plug-in adapter includes a thread designed to screw the plug-in adapter to an adjustment instrument, a plug-in device designed for detachably connecting the plug-in adapter to a counter plug-in device of an access opening on a robot for a reference position marking of the robot, and a stylus designed to couple a measuring tip of the adjustment instrument to the reference position marking. The plug-in device has a plug-in section that is designed for axially plugging of the plug-in section into the counter plug-in device of the robot.

14 Claims, 4 Drawing Sheets

(51) Int. Cl.
*B25J 19/00* (2006.01)
*B25J 9/16* (2006.01)
*B25J 9/00* (2006.01)
*G01D 5/244* (2006.01)

(52) U.S. Cl.
CPC .......... *B25J 19/0066* (2013.01); *G01D 11/24* (2013.01); *G01D 5/24442* (2013.01)

(56) References Cited

U.S. PATENT DOCUMENTS

| | | | |
|---|---|---|---|
| 2012/0048027 A1* | 3/2012 | Hashiguchi | B25J 13/085 73/763 |
| 2015/0127158 A1* | 5/2015 | Shimodaira | B25J 9/1694 700/258 |
| 2018/0354130 A1* | 12/2018 | Preisinger | B25J 9/1694 |
| 2019/0001501 A1* | 1/2019 | Roberts | B25J 19/0029 |
| 2019/0168381 A1* | 6/2019 | Tscharnuter | B25J 9/1015 |
| 2019/0291268 A1* | 9/2019 | Adachi | B25J 9/108 |
| 2019/0299417 A1* | 10/2019 | Kusaka | B25J 17/0241 |
| 2019/0308316 A1* | 10/2019 | Washizu | B25J 9/1664 |
| 2019/0322384 A1* | 10/2019 | Bosworth | G05D 1/101 |
| 2020/0163725 A1* | 5/2020 | Zhang | A61B 34/30 |

FOREIGN PATENT DOCUMENTS

| | | | |
|---|---|---|---|
| DE | 202009017089 | * 12/2009 | ............ B25B 15/02 |
| DE | 202009017089 U1 | 4/2010 | |
| EP | 0006160 A1 | 1/1980 | |
| EP | 2808655 A2 | 12/2014 | |
| JP | H0577177 A | 3/1993 | |

* cited by examiner

PLUG-IN ADAPTER, ADJUSTMENT INSTRUMENT, AND ASSOCIATED ROBOT

CROSS-REFERENCE TO RELATED APPLICATIONS

This application is a national phase application under 35 U.S.C. § 371 of International Patent Application No. PCT/EP2017/068188, filed Jul. 19, 2017 (pending), which claims the benefit of priority to German Patent Application No. DE 10 2016 213 965.7, filed Jul. 28, 2016, the disclosures of which are incorporated by reference herein in their entirety.

TECHNICAL FIELD

The invention relates to a plug-in adapter, comprising a thread, which is designed for screwing the plug-in adapter to an adjustment instrument. An associated adjustment instrument comprises a measuring tip, which, in a state of a plug-in adapter and the adjustment instrument being coupled to a counter plug-in device of a robot, is in contact with a stylus end of a probe tip of the plug-in adapter, when the probe tip scans a reference position marking of the robot. The invention also relates to an associated robot, which comprises this counter plug-in device.

BACKGROUND

From EP 0 006 160 A1, one knows of a device for the exact and reproducible adjustment of two interpenetrating mechanical parts, such as links of a robot. The special application field pertains to so-called industrial robots or handling devices, which execute certain reproducible movements via a program-controlled, electromotor-driven articulation system. In regard to these industrial robots, in the event of replacing or readjusting the position measuring system, such as a resolver on the robot axes, these must be brought to a so-called zero position, whereupon the position measuring system itself is then also brought to a so-called electrical zero position if applicable.

From DE 20 2009 017 089 U1, an electronic measuring device is known, which forms an adjustment instrument and comprises a housing, measurement electronics arranged inside the housing, and a rotating device connected to or integrated in the housing for loosening and/or tightening screws. In the case of the embodiment there, the measuring device has, on the front side of the housing, which also comprises an interior thread, a probe tip connected to electronics. In this case, the probe tip is a displacement transducer, whose signals are processed by the measurement electronics. The processed signals are transmitted via a connection line to a control device. The industrial robot described there comprises contoured indentations or grooves, which are allocated to its axes of rotation or joints and with which the probe tip is in contact during a movement of the relevant link assigned to the adjustment. Due to the contouring of the indentations or grooves, there results a contour-corresponding signal generated by the probe tip or generated by the electronics, based on which the control device can automatically execute the adjustment of the current axis of rotation or joint or allocated angle sensor.

SUMMARY

The object of the invention is to create a device and a correspondingly adapted robot, by means of which an adjustment instrument can be connected to the robot in a simple manner, particularly in a short amount of time and with little effort, to execute an adjustment of a reference position on at least one joint of the robot.

The object of the invention is achieved by a plug-in adapter comprising:
  a thread, which is designed for screwing the plug-in adapter to an adjustment instrument,
  a plug-in device, which is designed for detachably connecting the plug-in adapter to a counter plug-in device of an access opening on a robot for a reference position marking of the robot, and
  a stylus, which is designed for coupling a measuring tip of the adjustment instrument to the reference position marking, wherein the plug-in device comprises a plug-in section, which is designed for axially plugging the plug-in section to the counter plug-in device of the robot.

Industrial robots comprise multiple links and the links comprise mutually displaceable joints. The joints themselves or the axes of rotation, about which the joints can turn, are also referred to as robot axes among other things. Each joint is allocated a rotation angle sensor, which may be designed for example as a so-called resolver or as an incremental encoder. By means of a robot controller that controls drives, which also comprise motors that are arranged on the robot arm to move the links, and taking into account the measured values of the rotation angle sensors, it becomes possible to automatically bring every joint of the robot arm, in a manner controlled by the robot controller, into the desired rotation angle positions. So that one can adjust every joint very precisely and reproducibly, one must repeatedly determine in time intervals, prior to placing a robot into operation, whether the measured values of the rotation angle sensors also correspond to the actual angle position of the joint or the robot axis. In the event of any deviations, which take on positioning-relevant magnitudes, the rotation angle sensors must be adjusted or readjusted again to the actual angle position of the joint or the robot axis.

The reference position can generally be any predefined position of the considered joint. In a special design, the reference position is a so-called zero position of the considered joint, i.e., the position in which the joint is in its zero position. For a rotating joint, the zero position can be the zero-degree angle position of the joint, for example. The (real) zero position of the joint can possibly also deviate slightly from an ideal, i.e., exact, zero-degree position of the joint. To that extent, the hereafter mentioned reference position marking in the respective special design may also be a zero position marking. Reference position markings, such as adjustment notches for example, must thus not always represent the zero point exactly. First of all, any desired value may be assigned. In addition, after measuring the preliminarily adjusted robot system, the zero points in the controller can be re-calculated. Then the position of the adjustment notches is determined in relation to these measured zero points and stored as reference values, which are assigned to the respective axis during adjustment. In this way, one can factor in mostly small, production-related deviations. This saves costs and time, because the adjustment notches are simply applied, and they do not have to be transferred back and forth to correspond to a certain, exact value.

Adjusting the rotation angle sensors of a robot to the actual angle positions of its joints is generally done by the considered joint being brought to a predetermined starting position, which is also referred to as the zero position of the joint. This means that, by definition, in the zero position, the joint has or should have the rotation angle value of zero degrees.

The rotation angle sensors, particularly the resolvers or the incremental encoders, can either be set mechanically to this reference position, particularly this zero position of the respective joint, or the measured values, which are for example provided by the respective rotation angle sensors or incremental encoders in the mechanical reference position or zero position of the considered joint, can be allocated or assigned for example in the robot controller to the relevant zero-(angle)-degree position in a control-related manner. An adjustment generally occurs on the output side of the gear unit of the considered joint between two mutually displaceable structural parts of the joint. The joint does not necessarily have to be a rotating joint, but instead the joint can also be a sliding joint/slider joint, i.e., a linearly displaceable joint, such as a linear axis for example.

However, to first bring a considered joint exactly into this mechanical reference position, one typically uses an adjustment instrument that is essentially known per se.

Every joint of the robot comprises a link positioned directly in front of the joint in the kinematic chain of the robot arm and a link positioned directly after the joint. One of these two links has a reference position marking, which can be for example a mechanical notch on a circular-cylindrical outer wall of this link. The other link comprises an access opening, by means of which the reference position marking of the other link is accessible for the adjustment instrument. Such a reference position marking in each case and such an access opening in each case are assigned to every link of the robot arm.

Typically, the adjustment instrument is attached only briefly to the robot and removed from it particularly during the intended use of the robot. In addition, generally only one single adjustment instrument is used to measure all joints of the robot arm, i.e., to adjust to its respective reference position. This means that at the start of every adjustment process the adjustment instrument must be applied to the first access opening and then consecutively to all following access openings, i.e., the adjustment instrument must be repeatedly removed from access openings and re-applied. To date, one has known to provide at every access opening a fine thread, which corresponds to a corresponding fine thread of the adjustment instrument so that the adjustment instrument can be repeatedly screwed on to the robot arm and screwed off again. This is laborious particularly because the adjustment instrument, which can generally be an electrical or electronic measurement device, can also include an electrical connecting line, which connects the adjustment instrument to the robot controller, for example. Due to a coupling of the adjustment instrument to the access openings by means of the fine thread, it is actually also necessary to disconnect and reconnect the electrical connecting line every time.

By the fact that on the one hand the inventive plug-in adapter has a thread by means of which the plug-in adapter can be screwed to the adjustment instrument, and that on the other the plug-in adapter has a plug-in device, by means of which the plug-in adapter can be connected quickly and easily to counter plug-in devices of the access openings of the robot, one can eliminate the laborious screwing on and screwing off, while at the same time however the adjustment instrument itself remains unchanged and for example can continue to be used on robots, which do not comprise corresponding counter plug-in devices.

By means of the inventive solution, the multiple styluses present in each joint of the robot to date (one stylus per joint) can be eliminated and only one single stylus is used, which is also moved into the plug-in adapter. Accordingly, only one sleeve, i.e., one access opening, has to be provided with a counter plug-in device, but no stylus and no spring, on the robot on every axis, i.e., on every joint. The spring for retracting the stylus can be eliminated entirely. The plug-in adapter is screwed into the adjustment tool and then inserted into the sleeve or the counter plug-in device. The fit between the plug device of the plug-in adapter and the counter plug-in device is to be very tight so that loss in accuracy during adjustment is hardly noticeable or not present at all compared to a permanently built-in adjustment cartridge. Instead of a thread, one can mill into the mating surface of the plug-in adapter a curved groove, which together with a locking pin in the sleeve allows one to lock the plug-in adapter, for example in the sense of a bayonet coupling, with an approximately half-rotation for example. The interior surface of the sleeve is protected against debris by a cover with a bayonet coupling, when the plug-in adapter is not plugged in. The cover has a slit and is loosened and tightened using the blade of the adjustment tool. The pitch of the curved groove and the thread of the adjustment instrument are matched in such a manner that the plug-in adapter can generally be released out of the sleeve without the adjustment instrument loosening from the plug-in adapter. To release the plug-in adapter from the adjustment tool, a hexagonal head may be provided on the exterior surface of the plug-in adapter, which can be grasped using an open-end wrench or pliers.

The plug-in device, which is designed to detachably connect the plug-in adapter on a counter plug-in device of an access opening on a robot to a reference position marking of the robot, can be designed accordingly as a type of bayonet coupling for example.

In addition, the plug-in adapter has a stylus, which is designed for coupling a measuring tip of the adjustment instrument to the reference position marking, wherein the plug-in device has a plug-in section, which is designed for axially plugging the plug-in section to the counter plug-in device of the robot. In this way, the styluses on the robot can also be eliminated, which were previously required to be at each of the individual access openings in a spring-pretensioned manner on the robot arm.

The plug-in section may have a circular cylindrical outer wall, which forms a mating surface, which in a state of the plug-in adapter being coupled to the counter plug-in device of the robot, interacts with a counter-mating surface of the counter plug-in device, so that the plug-in adapter is positioned with sufficient accuracy in terms of measurement accuracy of the adjustment instrument to the counter plug-in device. The mating surface and the counter-mating surface are matched to each other in terms of their sizes and dimensional tolerances such that the plug-in adapter and consequently also the adjustment instrument connected to it are held so precisely to the respective access opening that a measurement can be taken with the required measurement accuracy. In other words, the plug-in adapter and consequently also the adjustment instrument connected to it may not have so much play, i.e., wobble so much, in the state where it is connected to the access opening, that the measurement would thereby become worthless.

The plug-in adapter may have a securing means, which is designed to secure the plug-in adapter, in its state of being coupled to the counter plug-in device of the robot, against unintended loosening from the counter plug-in device.

The securing means may comprise at least a form-fitting connection means that is manually releasable. The connecting means may, for example in the case of a bayonet closure-type connection, be formed from two opposing protrusions, which engage in a locking position in corresponding recesses, from which they can be released again, for example by a rotational movement. However, the securing means may also have at least one snap-action detent connection, of which the at least one detent protrusion engages in at least one detent recess. The detent protrusion and/or the detent recess may for example be positioned in an elastically pretensioned manner using a spring element. The spring elements may for example be manually releasable by means of a contact section so that one can release the respective detent protrusion from the detent recess when the plug-in adapter and consequently the adjustment instrument are to be removed from the robot.

The counter plug-in device may have a locking pin, and the plug-in device, the plug-in section or the circular-cylindrical outer wall of the plug-in section may thereby comprise a groove, which comprises a first groove section running at least essentially in an axial direction and a second groove section, connecting to the first groove section and running at least essentially transversely to the axial direction, into which the locking pin engages in a locking position of the plug-in adapter.

If the plug-in adapter with its plug-in device is inserted into the counter plug-in device, the at least one locking pin moves along in the first groove section and the plug-in device can be inserted in an axial direction into the counter plug-in device. If the plug-in device is fully inserted in the counter plug-in device, the plug-in adapter can be rotated and the at least one locking pin is squeezed into the second groove section, which runs at least essentially transversely to the axial direction, so that the plug-in adapter is thereby locked in a form-fitting manner to the counter plug-in device.

The groove, particularly the second groove section, may have a pitch that is larger than the pitch of the thread arranged on the rear end of the housing.

By the fact that the groove, particularly the second groove section, has a pitch that is larger than the pitch of the thread arranged on the rear end of the housing, one can ensure that when unscrewing the adjustment instrument from the access opening of the robot, the plug-in adapter is also always unscrewed together with the adjustment instrument and the screw connection does not loosen between the adjustment instrument and the plug-in adapter, and the plug-in adapter does not remain unintendedly in the access opening of the robot.

The second groove section may extend at an angle of less than 360 degrees, particularly less than 180 degrees over the circumference of the outer wall of the plug-in section. By the fact that the second groove section extends at an angle of less than 360 degrees, particularly less than 180 degrees over the circumference of the outer wall of the plug-in section, a complete unlocking or a complete locking of the plug-in adapter can occur at the access opening of the robot by a rotational movement of the plug-in adapter or the adjustment instrument by less than 360 degrees, particularly less than 180 degrees. For example, the second groove section may extend at an angle of 180 degrees or 90 degrees over the circumference of the outer wall of the plug-in section so that a complete unlocking or a complete locking of the plug-in adapter can occur at the access opening of the robot by a rotational movement of the plug-in adapter or the adjustment instrument by 180 degrees or 90 degrees, in other words by a half-rotation or a quarter-rotation.

The plug-in adapter may comprise a housing, having a front end and a rear end, wherein the thread is arranged at the rear end of the housing, the plug-in device is arranged at the front end of the housing, and the stylus is mounted in an axially adjustable manner in the housing of the plug-in adapter, wherein the stylus has a probe tip and a stylus end opposite the probe tip, and the stylus is designed to feel the reference position marking with its probe tip when the plug-in adapter is in a coupled state to the counter plug-in device of the robot, and the stylus end is designed to form a seat which is in contact with a measurement tip of the adjustment instrument when the adjustment instrument is in a state of being screwed on to the plug-in adapter.

The plug-in adapter may comprise a housing, which comprises an exterior contour, particularly in the shape of a hexagonal head or an external square head, which is designed to form a rotational attachment for an open-end wrench, particularly to disengage the plug-in adapter from the adjustment instrument.

The inventive task is also achieved by an adjustment instrument having a measuring tip, wherein the adjustment instrument comprises a counter-thread and the adjustment instrument comprises a plug-in adapter according to one or more of the described designs, by the plug-in adapter having its thread screwed on to the counter-thread of the adjustment instrument.

The invention also includes a robot having multiple links, joints that can mutually adjust the links, and at least one access opening to a reference position marking of at least one of the joints of the robot, which comprises a counter plug-in device, which is designed for coupling a plug-in adapter according to one or more of the described designs.

The robot may comprise an arm, which forms the automatically moveable parts of the robot, which may have in addition to this robot arm a programmable robot controller. A tool may be arranged as an end effector on a robot flange of the robot arm. The tool may be supplied with various media, which can be carried via a supply line from the robot arm to the tool.

Robot arms with associated programmable robot controllers, particularly industrial robots, are thus work machines, which can be equipped for automatic handling and are programmable in multiple movement axes, for example in terms of orientation, position and task sequence. Industrial robots typically comprise a robot arm having multiple links connected via joints and programmable robot controllers (control devices), which when in use automatically control or regulate the motion sequences of the robot arm to position and move a robot flange of the robot arm in a space. To do so, the links are moved via drive motors, particularly electrical drive motors, which are controlled by the robot controller, particularly in regard to the movement axes of the industrial robot, which represent the movement degrees of freedom of the joints. For example, the robot may be an industrial robot, which may be in particular a jointed-arm robot with axes of rotation, e.g., five, six or seven axes of rotation, which are serially sequential in a kinematic chain. The tool can thus be moved in a space by the joints of the robot arm being moved, i.e., displaced, in a controlled manner by the programmable robot controller.

An embodiment of the invention is depicted for illustrative purposes in the enclosed schematic drawings. Specific features of this embodiment, also possibly considered individually or in other combinations than those shown, may represent general features of the invention regardless in what specific context they are mentioned.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the invention.

DETAILED DESCRIPTION

Figure 1:
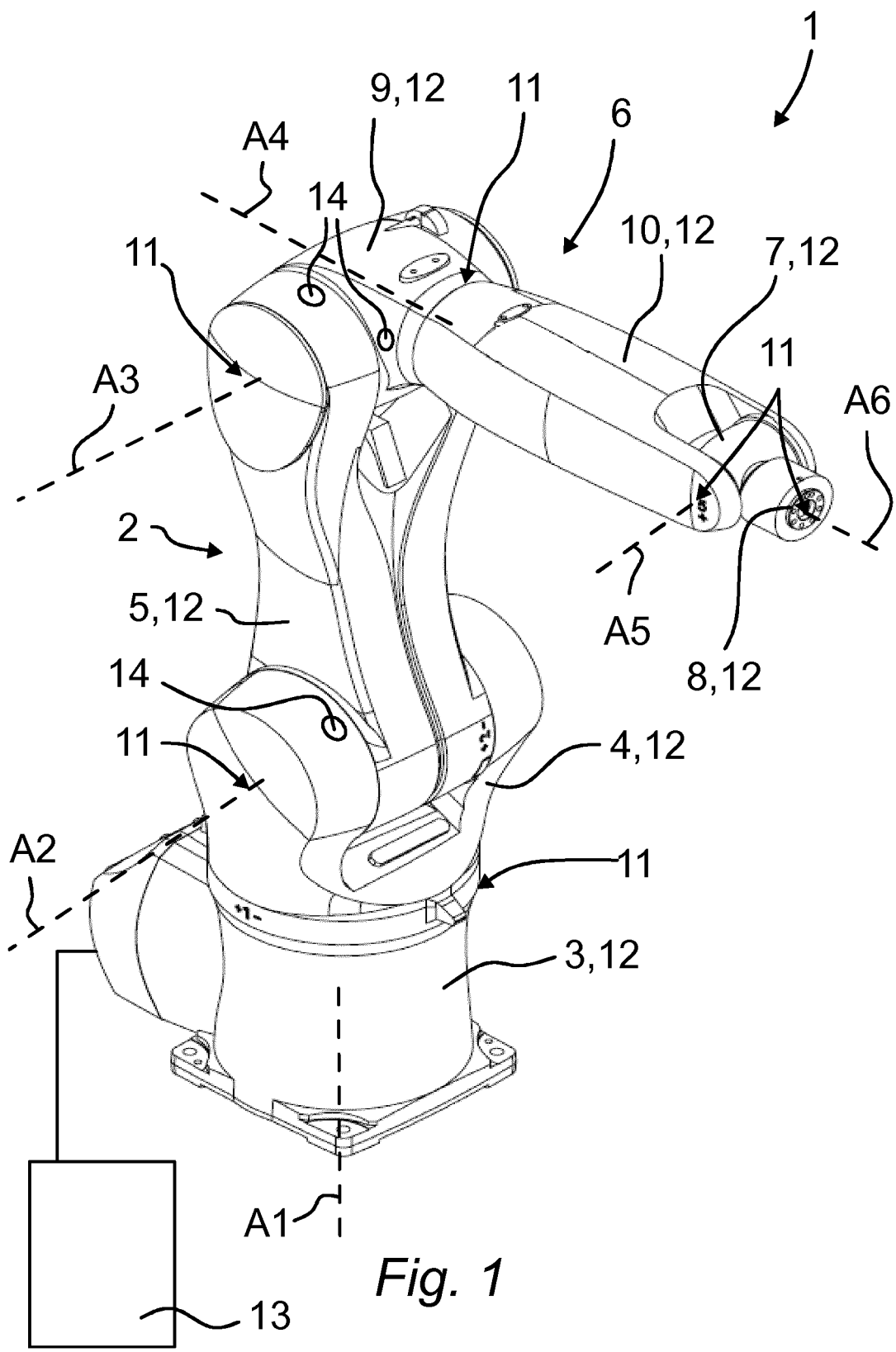
FIG. 1 depicts a perspective view of an illustrative robot having a robot arm and a robot controller.

FIG. 1 depicts a robot 1, which comprises a robot arm 2 and a robot controller 13. In this embodiment, robot arm 2 comprises multiple, sequentially arranged links 12 connected by means of joints 11. Links 12 involve in particular a frame 3 and a carousel 4 rotatably seated about an axis A1 running vertically relative to frame 3. Link arm 5 is pivotably seated on the lower end, e.g., on a not further depicted pivot bearing head, on carousel about a preferentially horizontal axis of rotation A2. On the upper end of link arm 5, boom arm 6 is pivotably seated about an also preferentially horizontal axis A3. Said boom arm carries on its end robot hand 7 with its preferentially three axes of rotation A4, A5, A6. In the present embodiment, boom arm 6 comprises a first housing component 9 pivotably mounted on link arm 5. On first housing component 9 of a first link 12 of boom arm 6, there is seated pivotably about axis A4 a second link 12 of boom arm 6. In the present embodiment, other links of robot arm 2 are, in addition to link arm 5, boom arm 6 and the preferentially multi-axis robot hand 7 having an attachment device designed as connection flange 8 for attaching an end effector, such as a tool or gripper for example.

Figure 2:
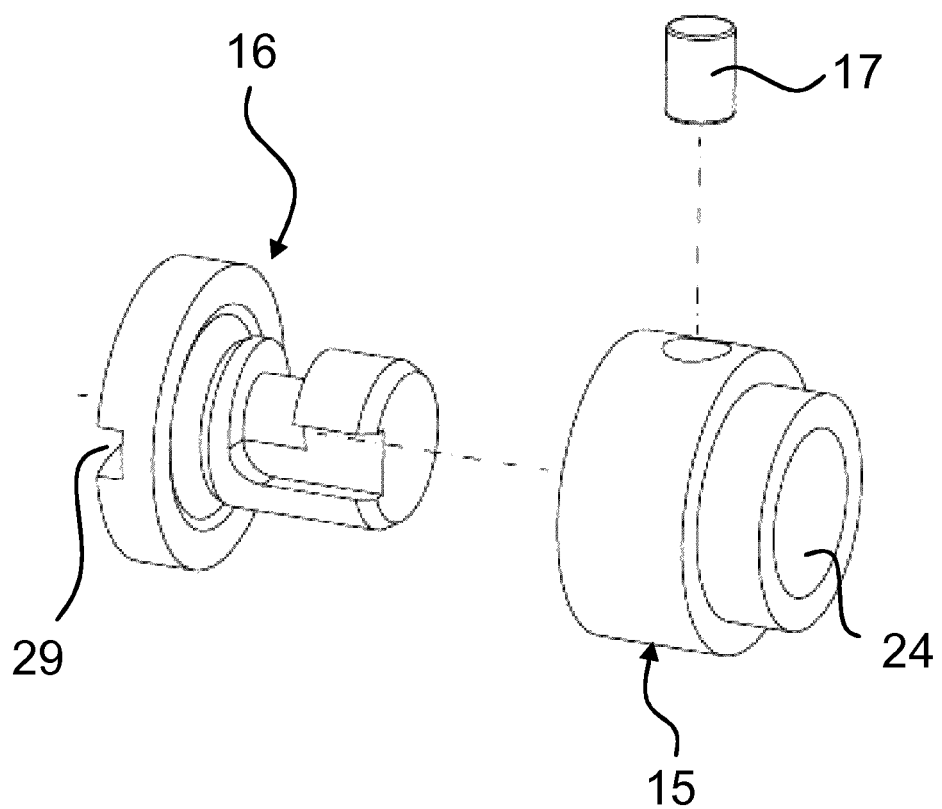
FIG. 2 depicts a perspective view of a counter plug-in device by itself (separately from the robot) and an assigned cover cap for the access opening of the counter plug-in device.

In the present embodiment, robot 1 comprises on each of its joints 11 respectively an access opening 14, of which FIG. 1 illustratively depicts three access openings 14 of three joints 11. Access openings 14 provide in each case access to one (not depicted) reference position marking of respective joint 11 of robot 1. Each access opening 14 carries a counter plug-in device 15, which is shown in FIG. 2 in a single representation without robot 1, along with a cover 16 and a locking pin 17.

Cover 16 is used to close access opening 14 when adjustment instrument 18 is removed from the robot. Cover 16 can prevent for example dust from penetrating into access opening 14 and thereby protect counter-mating surface 24 of counter plug-in device 15 against damage. To this end, cover 16 may have a similar form as plug-in device 22 of plug-in adapter 21 and thus also be furnished with a groove so that cover 16 can be locked against locking pin 17 of counter plug-in device 15. To lock and/or unlock cover 16 on counter plug-in device 15, cover 16 may have a slit 29, by means of which cover 16 can be turned using a tool, such as a slot screwdriver for example.

Figure 3:
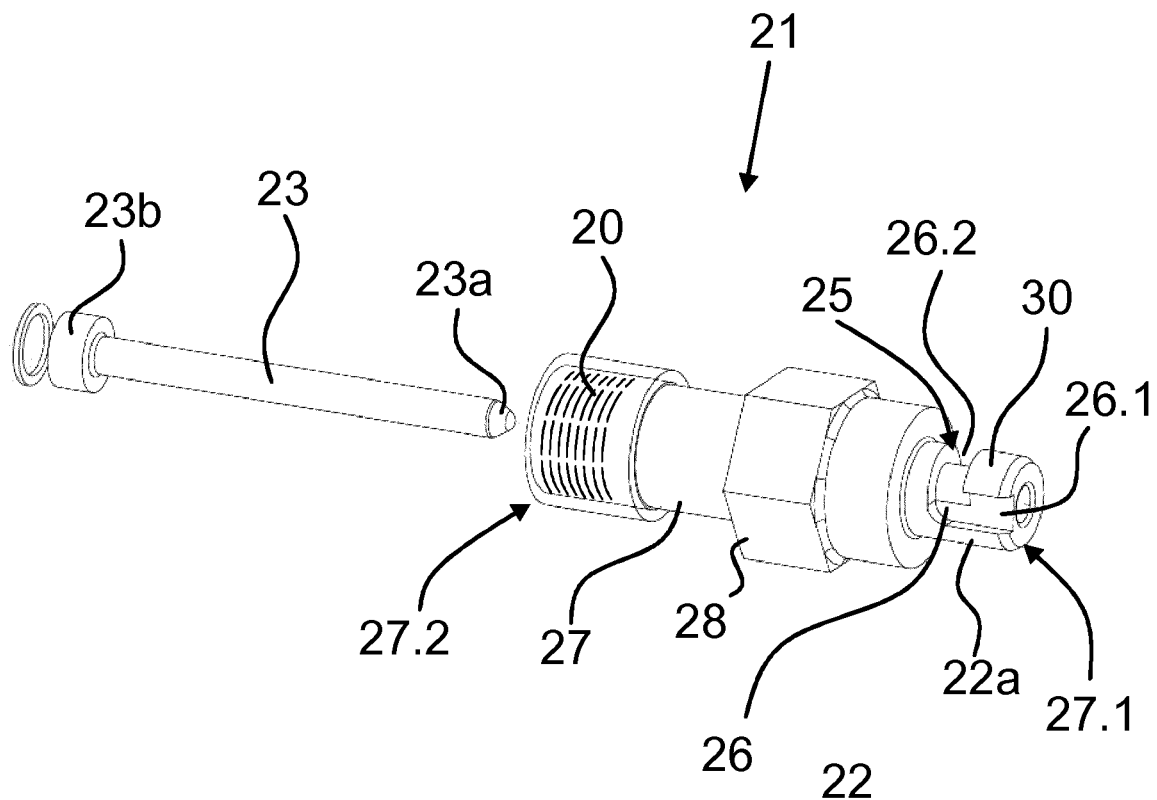
FIG. 3 depicts a perspective view of an inventive plug-in adapter having a separately depicted stylus.
Figure 4:
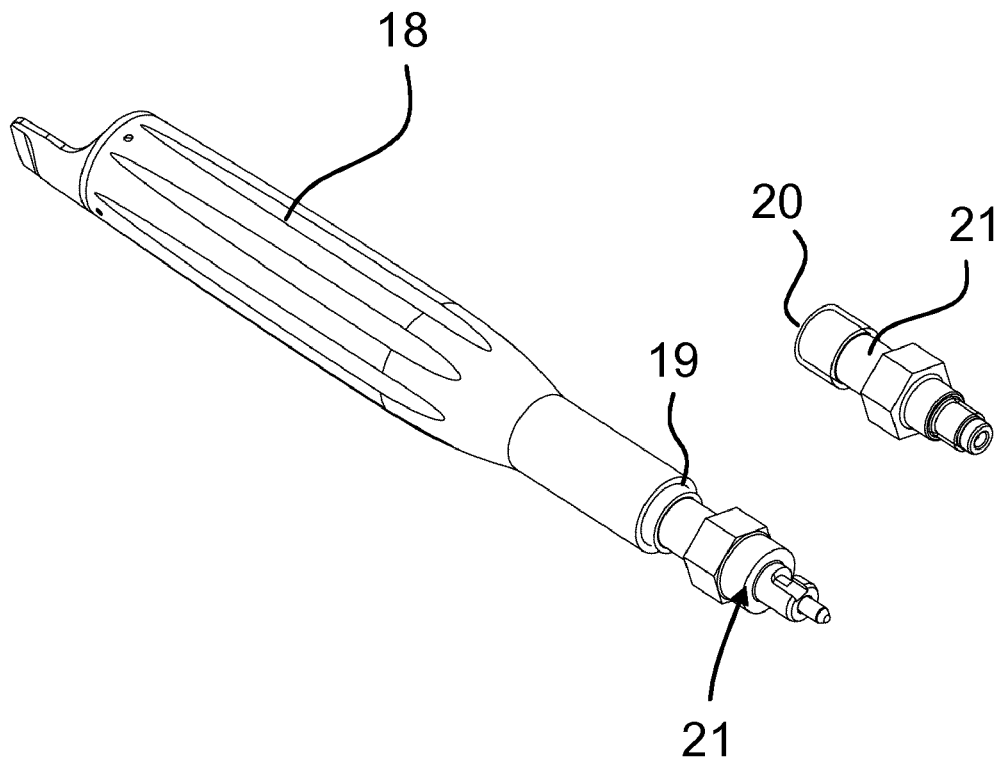
FIG. 4 depicts a perspective view of a plug-in adapter alone according to FIG. 3 and beside it, in a state where it is screwed to an adjustment instrument.

Counter plug-in device 15 is designed for coupling a plug-in adapter 21, as shown in FIGS. 3 and 4.

According to FIG. 4, adjustment instrument 18 comprises a not further shown measuring tip and a counter-thread 19, which can be screwed to a corresponding thread 20 of inventive plug-in adapter 21 to couple plug-in adapter 21 to adjustment instrument 18, as shown in FIG. 4.

According to FIGS. 3 and 4, plug-in adapter 21 comprises:

thread 20, which is designed for screwing plug-in adapter 21 to adjustment instrument 18 (FIG. 4), a plug-in device 22, which is designed for detachably connecting plug-in adapter 21 to counter plug-in device 15 of an access opening 14 on a robot 1 for a reference position marking of robot 1, and a stylus 23, which is designed for coupling a measuring tip of adjustment instrument 18 to the reference position marking, wherein plug-in device 22 comprises a plug-in section 22a, which is designed to axially connect plug-in section 22a to counter plug-in device 15 of robot 1.

In this embodiment, plug-in section 22a comprises a circular-cylindrical outer wall 30, which forms a mating surface, which, when plug-in adapter 21 is in a state coupled to counter plug-in device 15 of robot 1, interacts with a counter mating surface 24 of counter plug-in device 15 (FIG. 2) so that plug-in adapter 21 is seated on counter plug-in device 15 with sufficient accuracy in terms of the measurement accuracy of adjustment instrument 18.

In this embodiment, plug-in adapter 21 comprises a securing means 25, which is designed to secure plug-in adapter 21 in its state of being coupled to counter plug-in device 15 of robot 1 against the unintended disengagement from counter plug-in device 15.

To do so, counter plug-in device 15 comprises locking pin 17 and plug-in device 22, i.e., plug-in section 22a, or circular-cylindrical outer wall 30 of plug-in section 22a comprises a groove 26, which comprises a first groove section 26.1 running at least essentially in an axial direction and a second groove section 26.2, which connects to first groove section 26.1 and runs at least essentially transversely to the axial direction, into which locking pin 17 engages in a locking position of plug-in adapter 21.

Groove 26 or second groove section 26.2 thereby comprises a pitch, which is greater than the pitch of thread 20 arranged on the rear end of housing 27 of plug-in adapter 21.

In the present embodiment, second groove section 26.2 extends over an angle of approx. 180 degrees over the circumference of outer wall 30 of plug-in section 22a.

Plug-in adapter 21 comprises a housing 27 having a front end 27.1 and a rear end 27.2, wherein thread 20 is arranged on rear end 27.2 of housing 27, plug-in device 22 is arranged on front end 27.1 of housing 27, and stylus 23 is positioned in an axially displaceable manner in housing 27 of plug-in adapter 21, wherein stylus 23 comprises a probe tip 23a and a stylus end 23b opposite probe tip 23a, and stylus 23 is designed, in a state of the plug-in adapter 21 being coupled to counter plug-in device 15 of robot 1, to feel the reference position marking with its probe tip 23a and the stylus end 23b is designed to form a seat with which the measuring tip of adjustment instrument 18 is in contact when adjustment instrument 18 is in a state of being screwed (FIG. 4) to plug-in adapter 21.

Housing 27 of plug-in adapter 21 comprises an exterior contour, which in the present embodiment is designed in the form of a hexagonal head 28, which forms a rotational attachment for example for a non-depicted open-end wrench, particularly to release plug-in adapter 21 from adjustment instrument 18.

While the present invention has been illustrated by a description of various embodiments, and while these embodiments have been described in considerable detail, it is not intended to restrict or in any way limit the scope of the appended claims to such detail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

The invention claimed is:

1. A plug-in adapter, comprising:
   a housing;
   a screw thread on the housing and configured for threadably coupling the plug-in adapter to an adjustment instrument for calibrating a robot;
   a plug-in device on the housing and configured for detachably connecting the plug-in adapter to a counter plug-in device of an access opening on the robot for a reference position marking of the robot; and
   a stylus configured for coupling a measuring tip of the adjustment instrument with the reference position marking;
   wherein the plug-in device comprises a plug-in section configured to be axially plugged into the counter plug-in device on the robot; and
   wherein the plug-in section comprises a circular-cylindrical outer wall defining a mating surface that interacts with a counter mating surface of the counter plug-in device in a state wherein the plug-in adapter is coupled with the counter plug-in device of the robot, such that the plug-in adapter is mounted on the counter plug-in with minimal play between the plug-in adapter and the counter plug-in device that does not interfere with measurement accuracy of the adjustment instrument.

2. The plug-in adapter of claim 1, wherein the plug-in adapter further comprises a housing having an exterior contour configured to form a turning attachment for an open-end wrench.

3. The plug-in adapter of claim 2, wherein the exterior contour is configured in the shape of a hexagonal head or a square head.

4. The plug-in adapter of claim 2, wherein the exterior contour is configured for releasing the plug-in adapter from the adjustment instrument.

5. An adjustment instrument, comprising:
   a plug-in adapter according to claim 1; and
   a measuring tip configured for sensing a reference position marking of a robot.

6. A robotic manipulator, comprising:
   a plurality of links;
   a plurality of joints connecting the plurality of links and operable to adjust the positions of the links relative to one another;
   at least one access opening to a reference position marking of at least one of the links; and
   a counter plug-in device positioned in the access opening and configured for coupling with a plug-in adapter according to claim 1.

7. A plug-in adapter, comprising:
   a housing;
   a screw thread on the housing and configured for threadably coupling the plug-in adapter to an adjustment instrument for calibrating a robot;
   a plug-in device on the housing and configured for detachably connecting the plug-in adapter to a counter plug-in device of an access opening on the robot for a reference position marking of the robot;
   a stylus configured for coupling a measuring tip of the adjustment instrument with the reference position marking;
   wherein the plug-in device comprises a plug-in section configured to be axially plugged into the counter plug-in device on the robot; and
   a securing means configured to secure the plug-in adapter against unintended loosening of the counter plug-in device when the plug-in adapter is coupled with the counter plug-in device of the robot.

8. The plug-in adapter of claim 7, wherein:
   the counter plug-in device comprises a locking pin; and
   one of the plug-in device, the plug-in section, or the circular-cylindrical outer wall of the plug-in section comprises a groove configured to engage the locking pin in a locked position of the plug-in adapter;
   the groove including a first groove section running at least substantially in an axial direction of the plug-in adapter, and a second groove section connected to the first groove section and running at least substantially transversely to the axial direction.

9. The plug-in adapter of claim 8, wherein the groove has a pitch that is greater than a pitch of the screw thread proximate the first end of the housing.

10. The plug-in adapter of claim 9, wherein the pitch of the second groove section is greater than the pitch of the screw thread.

11. The plug-in adapter of claim 9, wherein the second groove section extends at an angle of less than 360 degrees over the circumference of the outer wall of the plug-in section.

12. The plug-in adapter of claim 11, wherein the second groove section extends at an angle of less than 180 degrees over the circumference of the outer wall of the plug-in section.

13. A plug-in adapter, comprising:
   a housing;
   a screw thread on the housing and configured for threadably coupling the plug-in adapter to an adjustment instrument for calibrating a robot;
   a plug-in device on the housing and configured for detachably connecting the plug-in adapter to a counter plug-in device of an access opening on the robot for a reference position marking of the robot; and
   a stylus configured for coupling a measuring tip of the adjustment instrument with the reference position marking;
   wherein the plug-in device comprises a plug-in section configured to be axially plugged into the counter plug-in device on the robot;
   wherein:
      the housing has a first end and an oppositely disposed second end,
      the screw thread is disposed proximate the first end of the housing,
      the plug-in device is disposed proximate the second end of the housing,
      the stylus is mounted in an axially displaceable manner within the housing, the stylus comprises a probe tip and a stylus end opposite the probe tip, the stylus is configured to sense the reference position marking with the probe tip in a state wherein the plug-in adapter is coupled with the counter plug-in device of the robot, and the stylus end is configured to form a seat that is in contact with a measuring tip of the adjustment instrument in a state wherein the adjustment instrument is screwed to the plug-in adapter.

14. An adjustment instrument, comprising:

a plug-in adapter, comprising:
- a housing,
- a screw thread on the housing and configured for threadably coupling the plug-in adapter to an adjustment instrument for calibrating a robot,
- a plug-in device on the housing and configured for detachably connecting the plug-in adapter to a counter plug-in device of an access opening on the robot for a reference position marking of the robot, and
- a stylus configured for coupling a measuring tip of the adjustment instrument with the reference position marking,
- wherein the plug-in device comprises a plug-in section configured to be axially plugged into the counter plug-in device on the robot; and a measuring tip configured for sensing a reference position marking of a robot;

wherein the measuring tip comprises a counter-thread corresponding to the screw thread of the plug-in adapter.

\* \* \* \* \*